United States Patent [19]

Breitenbacher et al.

[11] Patent Number: 5,439,245
[45] Date of Patent: Aug. 8, 1995

[54] SYSTEM FOR CHASSIS CONTROL

[75] Inventors: Juergen Breitenbacher, Winterbach; Stefan Otterbein, Stuttgart; Rainer Kallenbach, Waiblingen-Neustadt; Heinz Decker, Vaihingen Enz Riet, all of Germany

[73] Assignee: Robert Bosch GmbH, Stuttgart, Germany

[21] Appl. No.: 217,073

[22] Filed: Mar. 24, 1994

Related U.S. Application Data

[63] Continuation of Ser. No. 941,673, Sep. 8, 1992, abandoned.

[30] Foreign Application Priority Data

Oct. 5, 1991 [DE] Germany .................. 41 33 237.7

[51] Int. Cl.6 .................................. B60G 17/015
[52] U.S. Cl. ........................... 280/707; 364/424.05
[58] Field of Search .................. 280/707; 364/424.05

[56] References Cited

U.S. PATENT DOCUMENTS

| | | | |
|---|---|---|---|
| 4,602,805 | 7/1989 | Tanaka et al. | 280/708 |
| 4,807,128 | 2/1989 | Ikemoto | 364/424.05 |
| 4,826,205 | 5/1989 | Kouda et al. | 280/703 |
| 4,838,574 | 6/1989 | Baraszu | 280/707 |
| 4,846,496 | 7/1989 | Tanaka | 280/689 |
| 4,907,154 | 3/1990 | Yasuda et al. | 364/424.05 |
| 4,916,632 | 4/1990 | Doi et al. | 364/508 |
| 5,157,609 | 10/1992 | Stehle | 364/424.1 |
| 5,176,399 | 1/1993 | Takehara et al. | 280/707 |
| 5,218,545 | 6/1993 | Takehara | 280/707 |
| 5,383,124 | 1/1995 | Kunz et al. | 280/707 |

FOREIGN PATENT DOCUMENTS

| | | |
|---|---|---|
| 3738284A1 | 6/1988 | Germany . |
| 2158018 | 11/1985 | United Kingdom . |
| 2233940 | 1/1991 | United Kingdom . |
| 2234947 | 2/1991 | United Kingdom . |
| 90/14240 | 11/1990 | WIPO . |

OTHER PUBLICATIONS

Automotive Engineer Articles entitled "Developing Less-Active 'Active-Suspensions'" Dec. 1987 No. 6.
VDI Reports No. 778, 1989, "Adaptive ADS Damping for Control of Vehicle Suspension Dampers Dependent on Road Surface and State of Travel", by W. Klinker.
Article entitled "Calculation of Unknown Input Signals from Measured Signals on the Example of Uneveness Determination", by Dieter Konik.
Article Engigled "Computer Controlled Shocks Smooth Ride of GM Luxury Cars", by Jack Keebler.

Primary Examiner—Margaret A. Focarino
Assistant Examiner—Paul Dickson
Attorney, Agent, or Firm—Baker & Daniels

[57] ABSTRACT

A system for chassis control, specifically of passenger cars and trucks, where the control parameters of the controlled loop are varied for control of the chassis properties in contingence on the state of travel of the vehicle as determined by sensors. Specifically determined for recognition of the state of travel are parameters representing the vertical-dynamic state of movement of the vehicle and/or the individual driving style of the operator. This procedure is based upon the relative movements between the vehicle body and at least one wheel, captured by sensors.

8 Claims, 2 Drawing Sheets

SYSTEM FOR CHASSIS CONTROL

This is a continuation of application Ser. No. 07/941,673, filed Sep. 8, 1992, now abandoned.

BACKGROUND OF THE INVENTION

The invention concerns a system for chassis control, specifically of passenger cars and trucks, and, more particularly, to a system for chassis control having a controlled loop and control parameters.

Essential for the design of the chassis of a motor vehicle is an efficient spring and/or shock absorber system. For one, it should make allowance for road safety and, for another, it is desirable to afford the passengers or a shock-sensitive cargo of the vehicle a maximally high travel comfort. From the vantage point of the spring and/or shock absorber system, these are conflicting objectives. With the chassis which today largely continue to be used, high travel comfort can be achieved through a maximally soft chassis adjustment, whereas with regard to high road safety a maximally hard chassis adjustment is desirable.

To resolve this conflict in objectives in designing a chassis, a changeover is made from the passive chassis which today largely continue to be used to adjustable, adaptive or, in a further step, to controllable, active or semiactive chassis. Depending on the predicted use of the vehicle, a passive chassis is laid out in the assembly either tendentially hard (sporty) or tendentially soft (comfortable). Any influence on the chassis characteristic is during the travel operation not possible with these systems. With adaptive chassis, the characteristic of the chassis can be changed during operation by a (normally stepwise) change of the shock absorber and/or spring values, depending on the situation of travel. The performance corresponds then at any adjustment momentarily to that of a passive chassis. As opposed to such passive, or adaptive, chassis, only active or semiactive chassis make it possible to effect simultaneously a high road safety and higher travel comfort. This is accomplished in that at any point in time there are optimal forces generated, for instance by active or semiactive shock absorbers, which derive from an algorithm as a result of measured or computed variables of movement of the vehicle. On such active or semiactive chassis, the characteristic of the suspension and/or shock absorber system can be influenced as well during the travel operation, depending on the state of travel, by adaptation of the parameters (amplifications, time constants, threshold values) or of the structure of the algorithm, with the resulting performance at any adjustment not necessarily corresponding to that of a passive vehicle. For instance, with active or semiactive chassis it is possible to attenuate various frequencies of movement at the same time differently in that, for instance, a skyhook damping, i.e., a damping of the vehicle body movements and/or a frequency-dependent damping of the wheel movements is incremented in the algorithm of control.

In the design of such active or semiactive chassis it is known, e.g., to arrange between the wheel units, or axles, and the vehicle body suspension systems parallel to shock absorber systems. An active shock absorber features for instance a cylinder which by means of a piston is subdivided in two working chambers. The properties of the shock absorber can be controlled by an active introduction or by draining of the pressure fluid, that is, a selective force can be applied between the wheel units and the vehicle body. As an alternative, it is possible with the so-called semiactive systems to vary the damping properties, for instance by the use of a bypass whose cross section is controllable. The piston, for example, may feature a valve whose passage cross section can be controlled. The so-called semiactive shock absorber systems are not actively acted upon by the pressure agent.

In a paper by W. Klinkner ("Adaptives Dämpfungssystem ADS zur fahrbahn-und fahrzustandsabhängigen Steuerung von Dämpfern einer Fahrzeugfederung" [Adaptive damping system ADS for road surface and state of travel dependent control of shock absorbers of a vehicle suspension], VDI Report No. 778, Düsseldorf, 1989). The shock absorber adjustments of an adaptive chassis are adapted in contingence on the static parameters describing the character of the road surface. For that purpose, the signals of a body sensor and of a wheel acceleration sensor are used. The paper proposes a conditioning of the captured road surface unevennesses, classified by frequencies, in various frequency ranges, for which purpose several filters of parallel arrangement are employed. Unfavorable on such a system is the high expense in view of, for one, the sensor engineering and, for another, in view of the filters. Furthermore, no optimal adaptation of this control system is possible to different states of travel.

A paper by D. Konik (Berechnung unbekannter Eingangssignale aus Messsignalen am Beispiel der Unebenheitsermittlung" [Computation of unknown input signals from measured signals on the example of unevenness determination], AT Automatisierungstechnik 39 (1991) 6 pages 205–210) deals with the computation of unknown input signals from the measured signals of a system. Here, the road profile is computed with the aid of signals representing the acceleration of the vehicle body and of signals representing the relative path between the vehicle body and the wheels, with the aid of an inverse system design.

WO 90/14240 (PCT/DE 90/00343) proposes a process for chassis control of vehicles where the chassis characteristic is changed in contingence on the longitudinal and transverse dynamics of the vehicle. This is accomplished by an appropriate variation of control parameters. The respective transfer function of the controller is adapted thereby to the longitudinal and transverse dynamics of the vehicle, so that with noncritical states of travel the greatest possible comfort exists, whereas at critical states of travel a tight chassis tuning applies which favors safety. With the system described here, however, a comprehensive optimization of control parameters to additional states of movement of the vehicle cannot be achieved.

In the publication "Computer controlled shocks smooth ride of GM luxury cars," Automotive News, Sep. 3, 1990, the hardest damping is adjusted for a chassis having damping properties of an adaptively adjustable design whenever great accelerations, hard braking or extensive steering angles are sensed. Describing the driving style of the operator, these parameters thus lead to a hard, sporty chassis adjustment. While thereby a limited adaptation of the chassis adjustment to the driving style of the operator is possible, a differentiated valuation of the effect of the driving style, in conjunction with other variables of influence on the state of travel of the vehicle, is not realized with this system.

Lastly, the article "Automotive Engineer," vol. 12, No. 6, December 1987, on page 40, right-hand column, lines 24 through 36, proposes a chassis control system where the changeover of the shock absorber parameters takes place in contingence on the vehicle speed and acceleration and steering maneuvers. Neither is with this system an optimum result obtainable with regard to chassis control, by the mere changeover of damping parameters.

The problem underlying the present invention is to design an active or semiactive chassis control system which allows for the various states of travel.

SUMMARY OF THE INVENTION

The present invention provides recognition of the state of travel by determining at least one control parameter, the vertical-dynamic state or movement of the vehicle and/or the individual driving style of the operator.

With the inventional system for chassis control, the control parameters of the controlled loop of an active or semiactive chassis control system are changed for control of the chassis properties in contingence on the state of travel of the vehicle as determined by sensors. Allowance is made particularly for the vertical dynamic state of movement of the vehicle and/or the individual driving style of the operator. For that purpose, variables are determined which represent the vertical dynamic state of movement of the vehicle and/or the individual driving style of the operator. The respective transfer performance of the control loop is adapted, for control of the vehicle properties, to the determined state of travel by variation of the control parameters.

Determined from the relative movements between the vehicle body and at least one wheel unit, as captured by sensors, are particularly the variables representing the vertical dynamics of the vehicle. Variables representing the driving style of the operator may be effective values and/or peak values of the estimated and/or measured vehicle longitudinal acceleration, vehicle transverse acceleration, vehicle transverse velocity, the steering angle velocity, the velocity of throttle valve change, the engine speed and/or the velocity of engine speed change.

For vehicles with automatic transmission, the variables representing the individual driving style of the operator may be statistical parameters which describe the position of the transmission, specifically the frequency and speed of gear changes.

Furthermore, the driving style of the operator can be described by the actuation of the throttle valve switches and/or brake light switches.

In a favorable embodiment of the inventional system, statistical parameters which approximately describe statistically the properties of the road surface are determined as variables representing the vertical dynamic state of movement of the vehicle. Additionally, effective values and/or peak values of the spring deflection path, spring deflection velocity and/or the spring deflection acceleration can be utilized for determining the vertical dynamic state of movement of the vehicle.

Particularly favorable is determining the vertical dynamic state of movement of the vehicle from the effective values or peak values of the estimated wheel load variations of at least one wheel.

For a comprehensive chassis control, a further embodiment provides for utilizing, as a supplement to determining the vertical-dynamic state of movement of the vehicle and/or the individual driving style of the operator, the longitudinal and/or transverse dynamics of the vehicle for variation of the control parameters.

The inventional system utilizes the signals of the sensors customarily used for chassis control and/or the signals of other electrical or electronic vehicle partial systems in such a way that a comprehensive analysis of the state of travel of the vehicle can be performed by a specific processing of these sensor signals. Depending on the state of travel, the control parameters of the system are inventionally adapted to the respective state of travel. Obtained thereby are improved options for adapting the controller to the most varied travel performance of the vehicle.

The reconstruction of road surface profiles from the signals of spring deflection path and/or spring deflection velocity sensors, based on a simple vehicle model, enables a sensor schematic which as compared to other prior solutions is greatly simplified, where at the same time the necessary computational expense remains justifiably low.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
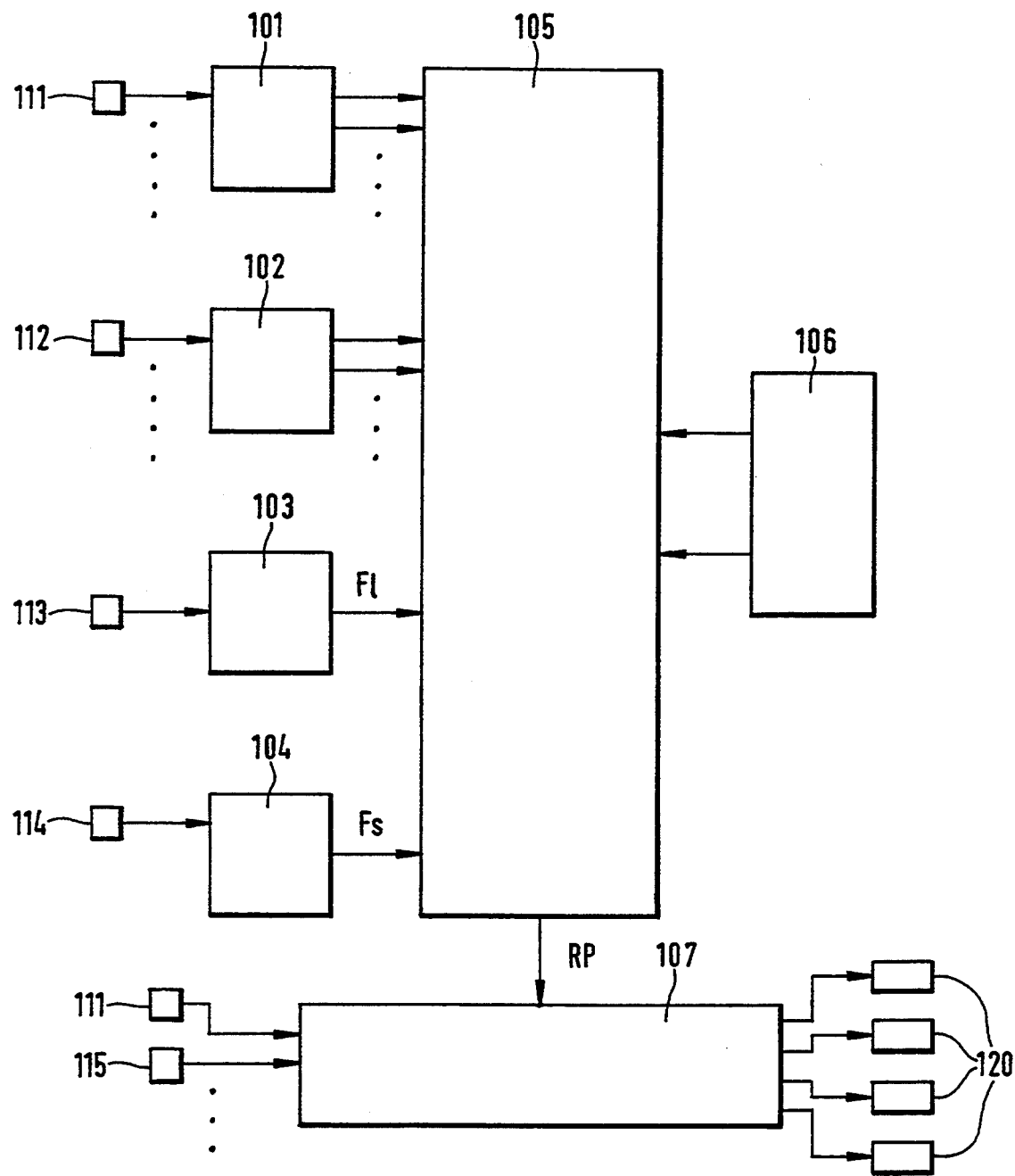
FIG. 1 is a block diagram of the chassis control system of the present invention.

The present embodiment is to illustrate the inventional system for control of a chassis with the aid of the block diagram relative to FIG. 1.

Referenced 101 through 104 in FIG. 1 are measuring and evaluation devices. 101 marks a first device for measuring and valuating the vertical-dynamic state of movement of the vehicle, while 102 signifies a second device for measuring and valuating the driving style of the operator, while 103 stands for a third device for measuring and valuating the longitudinal dynamics of the vehicle. Referenced 104 is a fourth device for measuring and valuating the transverse dynamics of the vehicle, while 105 marks a selection logic, 106 table memories, and 107 a control device or controller. The references 111 through 115 relate to capturing devices. Marked 111 are first means for detecting the spring deflection path, spring deflection velocity and/or the spring deflection acceleration. Marked 112 are second means for capturing the vehicle longitudinal acceleration, vehicle transverse acceleration, vehicle yaw velocity, the steering angle velocity, the throttle valve position, the throttle valve change velocity, the engine speed and/or the engine speed change velocity. Signified 113 are third means for capturing the vehicle longitudinal velocity, with 114 indicating fourth means for detecting the yaw velocity, vehicle transverse acceleration, the steering angle and/or the steering angle velocity. Referenced 115 are fifth means for capturing the body acceleration and/or the body velocity of the vehicle, while 120 indicates actuators.

The following will now address in detail the capturing and allowance for various shares of the state of travel of the vehicle by the measuring and valuation devices 101 through 104 and the pertaining capturing devices 111 through 115. To that end, the allowance for the vertical-dynamic state of movement of the vehicle by the first device 101 shall be illustrated, to begin with.

Basing on the signal of at least one spring deflection path or spring deflection velocity sensor arranged between a wheel and the body of the vehicle, the following signals can be determined at least approximately by suitable analog or digital signal processing (differentiation, integration, filtering):

The effective values and/or peak values of the spring deflection path S, the spring deflection velocity V and spring deflection acceleration A.

To form the effective values of the aforementioned variables, the quantitative values of the said signals can be formed each in analog or digital fashion (rectification). Obtained by subsequent low-pass filtering is an estimate for the effective value. If the signals allowed for are squared additionally, or in lieu of the quantitative formation, then low-pass-filtered and their root is then determined, estimated RMS (root mean squares) effective values are obtained. The selection logic 105 compares now the amounts of the individual effective values Seff, Veff, Aeff and/or peak values Smax, Vmax, Amax to one another, respectively to predetermined thresholds, and decides with the aid of these on the required tuning of the chassis control algorithm running in electronic controller 107. Several sensors arranged on different wheels can be evaluated also in the said way for determining the relative movements between wheel and vehicle body.

For peak value formation, the maximally occurred signal amplitude of the variables reviewed is evaluated over an established period of time. The period reviewed tracks always the real time progression in the sense of a sliding time window.

Thus, the selection logic 105 compares the effective values or peak values of the spring deflection path, spring deflection velocity captured in the first device 105 to predetermined thresholds and, depending on these results of comparison, transmits control parameters RP to the controller 107. The control parameters can be derived from the tables 106 in contingence on the results of comparison.

Another option of allowing for the vertical-dynamic state of movement of the vehicle consists in utilizing effective and/or peak values of the estimated wheel load variations of one or several wheels for variation of the control parameters. Signified as wheel load variation, or wheel load fluctuation, P is the variation of the wheel load (normal force between tire and road surface) from its static value. While this variation, and possibly also the tire deflection, which directly correlates to the wheel load fluctuation, is very difficult to measure, for instance the spring deflection path can be detected using transducers which allow a relatively simple, and thus low-cost realization. For obtaining the wheel load fluctuation P, the following will with the aid of the two-body model shown in FIG. 2 address the physical background.

Figure 2:
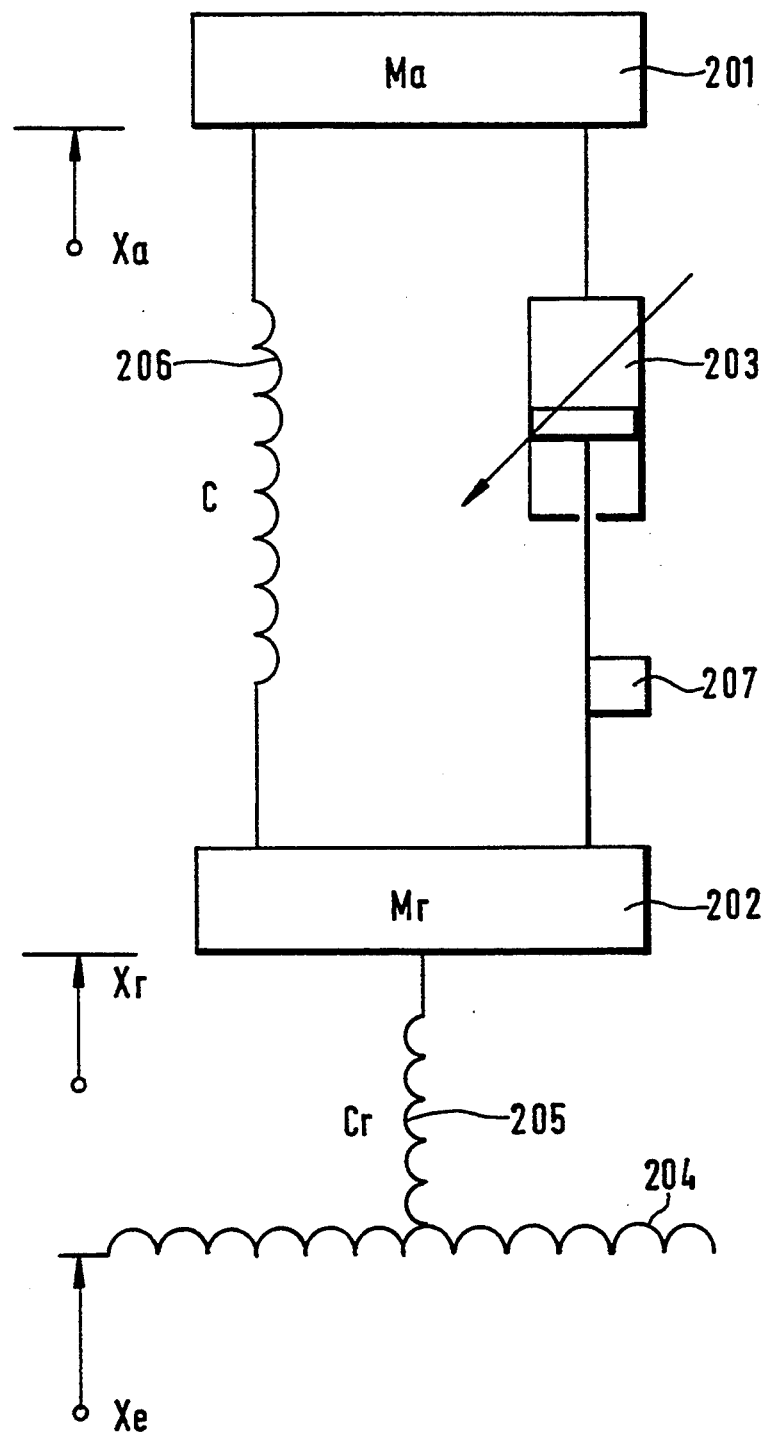
FIG. 2 is a schematic of a two-body model for a wheel unit.

References 201, 202, 203, 204, 205 and 206, in FIG. 2, indicate a two-body model for a wheel unit. The wheel is in contact with the road surface 204. The tire stiffness is described here, in model fashion, as spring 205 with the spring constant Cr. The combination of spring 206 and the shock absorber 203, controllable in terms of its damping property, stands here for the suspension and-/or shock absorber system of a wheel unit which is to be controlled or regulated. In this embodiment, the shock absorber is assumed to be controllable, whereas the properties of the spring 206 are described by a constant value C. Signified as Xa, or Xr, is the shift of the vehicle body 201, respectively the shift of the wheel, and at that, the shift out of the position of equilibrium at standstill of the vehicle (in no-load state). The unevennesses of the ground are described by Xe, while the mass of the vehicle body is signified as Ma and that of the wheel as Mr. The transducer 207 detects the spring deflection movements of the wheel unit. With the aid of this two-body model it can be deduced that the wanted variable P correlates with the spring deflection movement as follows:

$$P = -[(1+Mr/Ma)*C+(1+Mr/Ma)*d*s+Mr*s^2]*Xar, \quad (1)$$

where s is the Laplace variable. Signified as Xar is the so-called "deaveraged" deflection path resulting from the variable Xa−Xr by subtraction of its current average $$1/Tm * \int_{t-Tm}^{t} [Xa(r) - Xr(r)]dr \quad (2)$$

$$Xar(t) = \{Xa(t) - Xr(t)\} - \left\{1/Tm * \int_{t-Tm}^{t} [Xa(r) - Xr(r)]dr\right\} \quad (3)$$

Here, Tm is a tuning parameter while t is the actual point in time. Eliminated by this "deaveraging" of the deflection path Xa−Xr is both the effect of a vehicle load, i.e., a change of the static deflection path, and the effect of asymmetric (with regard to thrust and traction range) suspension and/or shock absorber characteristics (change of the average dynamic deflection) upon the computation of the wheel load fluctuations.

Used as a simplified embodiment substituting for the deaveraged deflection per equation (2) or (3) may also be the difference Xrel=Xa−Xr.

Hence, the signal P reflects at least approximately the dynamic wheel load variation, or wheel load fluctuation, in the vertical direction of a tire moving on a road. The dynamic wheel load fluctuation P, as described above, may be determined from the sensed deflection path in the first device 101. Possibly obtained also in some other way, such a signal of the dynamic wheel load fluctuation can now be utilized as well in the sense of the present invention as a vertical-dynamic parameter if, basing thereon, an effective value Peff and/or peak value Pmax obtained in the fashion described above is determined. These effective values, or peak values, of the dynamic wheel load fluctuation are compared in the selection logic 105 to predetermined thresholds and utilized with the aid of tables 106 for selecting the controller parameter RP of the controller 107.

Another favorable embodiment of the inventional system as regards influencing the controller parameters in contingence on the vertical-dynamic state of movement of the vehicle is based on statistical parameters which statistically describe approximately the properties of the road. This will be illustrated in detail in the following.

The vertical-dynamic state of movement of a wheel unit of a real vehicle is approximated well by the two-body model illustrated in FIG. 2. Obtained as theoretical correlation between the progression of the road surface Xe(t) and the distance measured between the wheel unit and the vehicle body with a suitable sensor 207 and using the coordinates and vehicle parameters shown in FIG. 2 is the formula relation in the Laplace range $$Xe = \frac{(C^*Cr + Cr^*d^*s + [C^*(Mar) + Cr^*Ma]^*s^2 + Mar^*d^*s^3 + Ma^*Mr^*s^4)}{Ma^*Cr^*s2} * Xar \quad (4)$$

with the Laplace variable s, where Mar=Ma+Mr is the sum of the proportional vehicle body mass and of the mass of the wheel, while Xar is the deaveraged deflection path or relative spring deflection path Xa−Xr. For practical realization of the inventional chassis control system, equation (4) resists favorable application, since the necessary dual integration of the spring deflection path signal cannot be realized in a controller in stable fashion. But a suitable approximation of equation (4) is $$Xe = \frac{(C^*Cr + Cr^*d^*s + (C^*Mar + Cr^*Ma)^*s^2 + Mar^*d^*s^3 + Ma^*Mr^*s^4)}{Ma^*Cr^*(s + e)^{2*}(s^2 + 2^*\text{delta}^*w^*s + w^2)} * Xar^*w^2, \quad (5)$$

where the variables e, w, and δ are filter parameters which, e.g., are adapted to the spring deflection movement signals to be evaluated and which assure a stable integration.

Equation (5) describes a timewise continuous, stable filter of fourth order. For implementation in a digital controller, this filter can be rendered discrete by means of known procedures. In this case, the first device 101 displays the transfer performance described in equation (5), where the determination of the spring deflection path or of the deaveraged spring deflection path is carried out by the first means 111.

Beyond the illustration described here it is possible to reduce the fourth order (n=4) filter arrangement described here by application of order reduction procedures, for instance in that a statement $$Xe = Xar^*[b_i^*s^i]/[a_j^*s^j] \quad (6)$$

is in the sense of smallest error squares so adapted that equation (4), or equation (5), will be optimally approximated in a reviewed frequency band. This makes it possible to further reduce the computational expense required in the controller.

If in the vehicle reviewed there are spring deflection path velocity signals Xar' available instead of spring deflection path signals Xar, the procedure described above can be used as well. In this case, equation (4) is substituted by $$Xe = \frac{(C^*Cr + Cr^*d^*s + [C^*(Mar) + Cr^*Ma]^*s^2 + Mar^*d^*s^3 + Ma^*Mr^*s^4)}{Ma^*Cr^*s^3} * Xar' \quad (7)$$

while (6) is substituted by $$Xe = \frac{(C^*Cr + Cr^*d^*s + (C^*Mar + Cr^*Ma)^*s^2 + Mar^*d^*s^3 + Ma^*Mr^*s^4)}{Ma^*Cr^*(s + e)^{3*}(s + w)} * Xar'^*w. \quad (8)$$

The illustrated procedure may be applied to one or several wheels of the vehicle reviewed. In a preferred embodiment, only the spring deflection signals of both front wheels are allowed for, since the road surface profiles coordinated with the rear wheels approximately correspond to those of the front wheels with a time difference T deriving from the wheel base L and the travel speed V according to T=L/V. In this embodiment, the first device 101 is additionally provided with a signal representing the travel speed of the vehicle.

The adaptation of the controller parameters RP of the controller 107, to control parameters RP describing the driving style of the operator, will be described hereafter as a further embodiment of the inventional system. In this context, FIG. 1 contains a second device 102 for measuring and evaluating the driving style of the operator, which device is provided with appropriately processed sensor signals by the second means 112. The parameters utilized for adaptation of the controller parameters can be determined as detailed in the following.

Basing on the longitudinal acceleration signal AL, which results for example from a longitudinal acceleration sensor or suitable processing of a vehicle speed signal VL (for example tachometer, ABS), statistical parameters such as (RMS) effective values and/or peak values of the longitudinal acceleration are determined. This may take place in the second device 102, with the second means 112 capturing in this case the longitudinal acceleration of the vehicle. Compared in the selection logic 105, for example, are the amounts of the effective value ALeff and/or of the peak value ALmax, to one another or to predetermined thresholds. With the aid of the results of these comparisons as well as, as the case may be, of further parameters described farther down, the control parameters RP of the controller 107 are adapted to the driving style of the operator, for instance with the aid of the tables 106.

For effective value formation, the quantitative values of the said signals can be formed in analog or digital fashion (rectification). Obtained by a subsequent low-pass filtering is an estimate for the effective value. When additionally, or instead of the amount formation, squaring the signals allowed for, then low-pass filtering and thereafter determining the root, estimated RMS (root mean squares) effective values are obtained. For peak value formation, as already described above, the maximally occurring signal amplitude of the variable reviewed is determined over an established period of time. The period of time reviewed must always track the real time progression in the sense of a sliding time window.

Another possibility of allowing for the driving style of the operator will be illustrated hereafter. Basing on a signal AQUER which is proportional to the transverse acceleration of the vehicle and which can be determined either by direct measurement with the aid of a suitably arranged transverse acceleration sensor or by computation from other variables, for instance the vehicle speed VL and the steering angle DELTA, statistical parameters such as (RMS) effective values and/or peak values of the transverse acceleration are determined. The amounts of the effective value AQUEReff and/or of the peak value AQUERmax are in the selection logic 105 compared to one another, or to predetermined thresholds, and—depending on the results of comparison and, as the case may be, depending on further parameters—the control parameters RP are adapted to the driving style of the operator.

A further option of adapting the control parameters RP to the driving style of the operator is based on a signal PSIP which is proportional to the yaw velocity of the vehicle. Captured in second means 112, this signal can be determined either by direct measurement, for instance with a suitable yaw velocity sensor, or by computation from other parameters, for instance the vehicle speed VL and the steering angle DELTA. Basing on the signal PSIP, statistical parameters such as (RMS) effective values and/or peak values of the yaw velocity are determined. This occurs in the second device 102. The selection logic 105 compares the amounts of the effective value PSIPeff and/or of the peak value PSIPmax to one another, or to predetermined thresholds, and decides with the aid of these and, as the case may be, further parameters on the tuning to be effected, of the chassis control algorithm proceeding in electronic controller 107. For that purpose, the control parameters RP of the controller 107 are varied appropriately.

Basing on a signal DELTAP which is proportional to the steering angle velocity and which can be measured directly either by a suitably arranged steering angle encoder and/or a steering angle velocity encoder, or also with the aid of a suitably arranged linear path or velocity encoder, or can be found by computation from other magnitudes, the statistical parameters such as (RMS) effective values and/or peak values of the steering angle velocity are determined. This takes place in analogy to the embodiments described above in the second devices 102, or under utilization of data sensed by the second means 112. In this embodiment, too, the amounts of the effective value DELTAPeff and/or peak values DELTAPmax are compared to one another or to predetermined thresholds. Using these results of comparison and, as the case may be, additional parameters, the control parameters RP are determined.

Basing on a throttle valve signal ALPHA and/or a throttle valve change velocity signal ALPHAP obtained either by a suitably arranged angle encoder, angular velocity encoder or also with the aid of a suitably arranged linear path or velocity encoder, statistical parameters such as (RMS) effective values and/or peak values of the described throttle valve signals are determined. Used for that purpose may also be signals from other electronic vehicle partial systems, provided they are transmitted to the second device 102 through a suitable information link. As a substitute, a corresponding signal may be derived from the gas pedal position, if the respective vehicle does not feature a throttle valve. The amounts of the effective values ALPHAeff, or ALPHAPeff, and/or of the peak values ALPHAmax or ALPHAPeff are compared to one another or to predetermined thresholds in the selection logic 105. With the aid of these results of comparison and, as the case may be, further parameters, the control parameters RP are determined appropriately.

Basing on an engine speed signal N or an engine speed change signal NP determined either by suitably arranged angle encoders or RPM encoders, or which via a suitable information link can be conveyed from other electronic vehicle partial systems, statistical parameters such as (RMS) effective values and/or peak values of the described engine speed signals are determined. The respective effective values Neff or NPeff and/or the peak values Nmax or NPmax are then compared in the selection logic 105 to one another or to predetermined thresholds. With the aid of these results of comparison and, as the case may be, further parameters the control parameters RP of the controller 107 are adapted.

Another option of obtaining appropriate parameters for making allowance for the driving style of the operator consists in determining the position of the vehicle transmission. The latter may be provided to the chassis control system preferably also by other electronic vehicle partial systems, such as an electronic transmission control, via a suitable information link. Thus, when determining the position of the transmission, respectively the frequency and speed of changes of the transmission positions, statistical parameters are arrived at, with which appropriate control parameters may be coordinated in the selection logic 105, facultatively through the tables 106.

Statistical parameters describing the actuation of throttle valve switches or gas pedal switches or brake light switches are to be utilized preferably in the case of vehicles with automatic transmission, in the context of the inventional system. Furthermore, the signals of switches used for determination or recognition of full load (throttle valve switches) as well as the brake light switches available on any vehicle can be used for statistical evaluation according to the inventional system. By means of known procedures, statistical parameters characterizing the driving style of the respective driver can be determined from these signals and as well utilized for parameter adaptation of the described chassis control system.

The aforementioned procedures for taking the driving style of the operator into account can be used for adaptation of the control parameters either individually or in any combination.

As an extension of the procedures for statistical parameter determination as illustrated above, the following procedures are to be mentioned.
1. Counting procedures for frequency determination within predetermined signal classes.
2. Frequency analysis (for with FFT).
3. Correlation procedures as well as other sample recognition procedures for extraction of characteristics "clusters" pointing toward specific, operator-typical driving maneuvers.
4. Parameter identification procedures which, for example, determine a greatly simplified dynamic model (for instance in the form of a differential equation or transfer function) of the respective driver, from the time progressions of the underlying signals.

Common to all of the said evaluation methods is that they must explicitly allow for-a timewise variable performance, in order to be able to allow for driver changes or modifications of the driving behavior. Used for that purpose are preferably time weightings or timewise tracked data capturing windows.

As a complement to allowing for the vertical-dynamic state of movement of the vehicle and/or the driving style of the operator, the longitudinal and/or transverse dynamics of the vehicle may be utilized for recognition of the state of travel. This is indicated in FIG. 1 by the third and fourth devices 103 and 104, respectively by the pertaining third and fourth means 113 and 114.

Here, the longitudinal dynamics of the vehicle is determined in the third device 103. Provided for that purpose are the third means 113, which, e.g., may contain sensors determining the vehicle longitudinal velocity and/or the vehicle longitudinal acceleration. Deriving thereof by differentiation is an approximate value for the tire longitudinal forces F1. Applicable, as described in WO 90/14240, is the equation $$F1 = Mges * Vl' \qquad (9),$$

where Mges is the mass of the vehicle and Vl' is the vehicle longitudinal acceleration. The signal representing the tire longitudinal force F1 is fed by the third device 103 to the selection logic 105. In the latter, the control parameter corresponding to the tire longitudinal forces can be selected, for instance from the table 106. Transmitted to the fourth device 104 are signals from the fourth means 114 representing, e.g., the steering angle, yaw velocity and the vehicle transverse acceleration. As the case may be, not all of the input parameters are necessary. In the fourth device 104, an approximate value for the tire side force Fs is formed from the described input parameters. This side force is transmitted to the selection logic 105 where the control parameters are appropriately selected, for example by means of table 106.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling an active or semi-active chassis on a vehicle, said chassis having at least one actuator, said method comprising the steps of:
    sensing a state of travel of the vehicle, said state of travel representing an individual driving style of a driver;
    generating at least one control parameter dependent on said state of travel, said generating step including the step of determining a statistical value based on at least one of effective values and peak values corresponding to one of a throttle valve position and a throttle valve change velocity, said generating step further including the step of determining said control parameter dependent on said statistical value;
    varying an output of a controller dependent on said control parameter; and
    controlling said at least one actuator utilizing said controller.

2. The method of claim 1, wherein said state of travel further represents a vertical dynamic state of movement of the vehicle, and further comprising the step of determining statistical parameters which represent unevenness of a road, and said generating step comprises determining at least one of effective values and peak values corresponding to:
    a spring deflection path;
    a spring deflection velocity;
    a spring deflection acceleration; and
    estimated wheel load variations of at least one wheel.

3. The method of claim 1, wherein said state of travel further represents at least one of longitudinal dynamics of the vehicle and transverse dynamics of the vehicle.

4. The method of claim 1, wherein said generating step further includes the step of determining at least one of effective values and peak values corresponding to:
    estimated vehicle longitudinal velocity;
    measured vehicle longitudinal velocity;
    vehicle transverse acceleration;
    vehicle yaw velocity;
    steering angle velocity;
    engine speed;
    engine speed change velocity; and
    statistical parameters representing at least one of:
        frequency of transmission changes;
        speed of transmission changes;
        actuation of throttle valve switches; and
        brake light switches.

5. A system for controlling an active or semi-active chassis on a vehicle, said chassis having at least one actuator, said system comprising:
    a plurality of sensors for sensing a state of travel of the vehicle, said state of travel representing an individual driving style of a driver;
    a selection logic connected to said sensors, said selection logic generating at least one control parameter dependent on said state of travel, said selection logic including means for determining a statistical value based on at least one of effective values and peak values corresponding to one of a throttle valve position and a throttle valve change velocity, said selection logic further generating said control parameter dependent on said statistical value of said determining means; and
    a controller connected to said selection logic and said at least one actuator, said controller having an output which varies dependent on said control parameter, and said controller controlling said at least one actuator.

6. The system of claim 5 wherein said state of travel further represents a vertical dynamic state of movement of the vehicle, and further comprising means for calculating statistical parameters which represent unevenness of a road, and said calculating means calculates at least one of effective values and peak values corresponding to:
    a spring deflection path;
    a spring deflection velocity;
    a spring deflection acceleration; and
    estimated wheel load variations of at least one wheel.

7. The system of claim 5 wherein said state of travel further represents at least one of longitudinal dynamics of the vehicle and transverse dynamics of the vehicle.

8. The system of claim 5 wherein said determining means further includes means for ascertaining at least one of effective values and peak values corresponding to:
    estimated vehicle longitudinal velocity;

measured vehicle longitudinal velocity;
vehicle transverse acceleration;
vehicle yaw velocity;
steering angle velocity;
engine speed;
engine speed change velocity; and statistical parameters representing at least one of:
frequency of transmission changes;
speed of transmission changes;
actuation of throttle valve switches; and
brake light switches.

* * * * *